United States Patent
Ha et al.

(10) Patent No.: US 8,143,830 B2
(45) Date of Patent: Mar. 27, 2012

(54) BRUSHLESS MOTOR APPARATUS

(75) Inventors: Byung Gil Ha, Gimhae-si (KR); Ji Seok Park, Changwon-si (KR)

(73) Assignee: Creation & Motor Industries, Ltd., Masan-Si (KR)

( * ) Notice: Subject to any disclaimer, the term of this patent is extended or adjusted under 35 U.S.C. 154(b) by 329 days.

(21) Appl. No.: 12/597,810

(22) PCT Filed: Apr. 22, 2008

(86) PCT No.: PCT/KR2008/002268
§ 371 (c)(1),
(2), (4) Date: Oct. 27, 2009

(87) PCT Pub. No.: WO2008/133426
PCT Pub. Date: Nov. 6, 2008

(65) Prior Publication Data
US 2010/0134059 A1 Jun. 3, 2010

(30) Foreign Application Priority Data
Apr. 27, 2007 (KR) .................. 10-2007-0041515

(51) Int. Cl.
H02P 6/14 (2006.01)
H02P 6/16 (2006.01)
H02K 1/16 (2006.01)
(52) U.S. Cl. .......... 318/400.31; 318/400.38; 318/400.4; 318/139; 310/216.106; 310/113; 324/177; 340/664
(58) Field of Classification Search .................. 318/139, 318/400.31, 400.38, 400.4; 310/216.106; 324/177; 340/664
See application file for complete search history.

(56) References Cited

U.S. PATENT DOCUMENTS
5,942,865 A   8/1999   Kim
(Continued)

FOREIGN PATENT DOCUMENTS
JP   63-234893   9/1988
(Continued)

OTHER PUBLICATIONS
PCT International Search Report of Int'l Application No. PCT/KR2008/002268 filed on Apr. 22, 2008.

*Primary Examiner* — Paul Ip
(74) *Attorney, Agent, or Firm* — Kile Park Goekjian Reed & McManus PLLC (57) ABSTRACT

A blushless direct current (BLDG) motor apparatus includes: a stator which is provided with a plurality of windings corresponding to N phases and wound in parallel independently of each other; a rotor which has a plurality of poles corresponding to the plurality of windings and rotates with respect to the stator by excitation of the windings; a switching unit which is provided in the form of a full H-bridge with respect to each phase, comprises a pair of upper switching devices corresponding to a (+) side of the winding and a pair of lower switching devices corresponding to a (−) side of the winding, and performs a switching operation to supply or not to supply driving power to the winding; a first sensing device which senses the phase of the rotor with respect to the stator to determine whether to turn on or off the upper switching device; a second sensing device which is provided in the latter part than the first sensing device and senses the phase of the rotor with respect to the stator to determine whether to turn on or off the lower switching device; and a controller which uses a partial square wave to drive the upper switching device and the lower switching device on the basis of the sensed phase of the rotor, and controls the lower switching device to be turned off later than the upper switching device by more than a time to exhaust an electric current staying in the winding.

14 Claims, 9 Drawing Sheets

U.S. PATENT DOCUMENTS

| | | | |
|---|---|---|---|
| 6,359,401 B1 * | 3/2002 | Garcia-Sinclair et al. | 318/400.4 |
| 6,710,581 B1 * | 3/2004 | Lee | 322/39 |
| 7,164,362 B2 * | 1/2007 | Hiramine et al. | 340/664 |
| 7,884,580 B2 * | 2/2011 | Lee | 322/39 |
| 2005/0179428 A1 * | 8/2005 | Hiramine et al. | 324/177 |
| 2010/0052451 A1 * | 3/2010 | Lee | 310/113 |

FOREIGN PATENT DOCUMENTS

| | | |
|---|---|---|
| JP | 10-146092 | 5/1998 |
| JP | 2004-215002 | 7/2004 |
| KR | 10-2003-0017042 A | 3/2003 |
| KR | 10-2004-0066585 A | 7/2004 |

* cited by examiner

BRUSHLESS MOTOR APPARATUS

TECHNICAL FIELD

The present invention relates to a motor apparatus, and more particularly, to a brushless direct current (BLDC) motor apparatus capable of rotating at high speed and having high efficiency.

BACKGROUND ART

Since a brushless direct current (BLDC) motor apparatus has no mechanical contact, it has little noise, long lifespan, simple maintenance such as no need of brush replacement or the like, etc. as compared with a motor apparatus having a brush. Accordingly, the BLDC motor apparatus has been widely used as a motor for industrial equipment, home appliances, transport systems, etc.

With regard to such motor apparatus, technology that enables the motor apparatus to rotate at higher speed, have strong start torque, and output constant power has been disclosed in Korean Patent Registration No. 10-0415493.

According to this technology, a low efficiency region, i.e., a region where a counter electromotive force is generated is not used, so that the motor apparatus can have advantages of high efficiency, high stability, simple configuration without a protective circuit, long lifespan, and convenient maintenance.

Such a conventional technology is configured to simultaneously turn on and off switching devices of an upper side (+) and a lower side (−) that constitute an H-bridge. With this configuration, in particular, when the switching device is turned off, an electric current flowing in a winding suddenly has no where to go and returns back to the (+) side via a diode connected to the switching device of the opposite upper side. At this time, there is no problem if the amount of electric current is small. However, if the amount of electric current is large, the switching device operates abnormally, so that the switching device can be reduced in lifespan or damaged.

Meanwhile, the conventional technology uses a photo-sensor or the like to sense a phase of a rotor. However, the photo-sensor additionally needs an encoder corresponding to polarity of the rotor so that the photo-sensor can sense the poles. This is the reason why the production costs of the motor apparatus increase, the structure thereof becomes complicated, and the accuracy of the motor apparatus is lowered. In addition, the photo-sensor itself is more expensive, shorter in lifespan, lower in accuracy, and lower in reliability under damp, dust or the like contaminated environment moisture than other sensors.

Further, the conventional technology includes a plurality of slots for the winding of the rotor. However, if the windings of two adjacent slots allow the electric currents to flow in the same direction, collision of magnetic fluxes causes the magnetic fluxes to offset each other and thus the efficiency of the motor apparatus decreases.

DISCLOSURE OF INVENTION

Technical Problem

The present invention is conceived to solve the above-described problems, an aspect of which is to provide a brushless direct current (BLDC) motor apparatus of which a switching device is prevented from malfunction and damage.

Further, another aspect of the present invention is to provide a BLDC motor apparatus with a rotor sensor having inexpensive production costs, a long lifespan, a simple structure, and high reliability.

Also, a third aspect of the present invention is to provide a BLDC motor apparatus improved in motor efficiency.

Technical Solution

The foregoing and/or other aspects of the present invention are achieved by providing a blushless direct current (BLDC) motor apparatus including: a stator which is provided with a plurality of windings corresponding to N phases and wound in parallel independently of each other; a rotor which has a plurality of poles corresponding to the plurality of windings and rotates with respect to the stator by excitation of the windings; a switching unit which is provided in the form of a full H-bridge with respect to each phase, includes a pair of upper switching devices corresponding to a (+) side of the winding and a pair of lower switching devices corresponding to a (−) side of the winding, and performs a switching operation to supply or not to supply driving power to the winding; a first sensing device which senses the phase of the rotor with respect to the stator to determine whether to turn on or off the upper switching device; a second sensing device which is provided in the latter part than the first sensing device and senses the phase of the rotor with respect to the stator to determine whether to turn on or off the lower switching device; and a controller which uses a partial square wave to drive the upper switching device and the lower switching device on the basis of the sensed phase of the rotor, and controls the lower switching device to be turned off later than the upper switching device by more than a time to exhaust an electric current staying in the winding.

The controller may control the lower switching device to be turned on earlier than the upper switching device.

The controller may control the lower switching device to be turned on or off at a pole altering point.

The controller may control the upper switching device to be turned on in a 70% region of the maximum magnetic flux of the rotor.

The time to exhaust the electric current staying in the winding may correspond to a rotation speed of the rotor.

At least one of the first sensing device and the second sensing device may include a Hall sensor.

At least one of the first sensing device and the second sensing device may include a resolver.

The stator include: a plurality of slots on which the winding is wound; and a magnetic-flux collision preventing groove provided between two adjacent slots.

Advantageous Effects

The present invention provides a BLDC motor apparatus capable of preventing a switching device from malfunction and damage.

Further, according to the present invention, a high-efficiency motor can be achieved, output density can increase, and a high-powered BLDC motor can be achieved.

Also, according to the present invention, a torque ripple can be reduced. In other words, only a high efficiency region, i.e., a region for achieving a certain torque is used, so that the torque ripple first becomes small within one section corresponding to one pole of one phase, and then torque with this small torque ripple forms a liner torque scheme by combination of phases connected in parallel, thereby achieving the liner torque with the very small torque ripple.

BEST MODE FOR CARRYING OUT THE INVENTION

Figure 1:
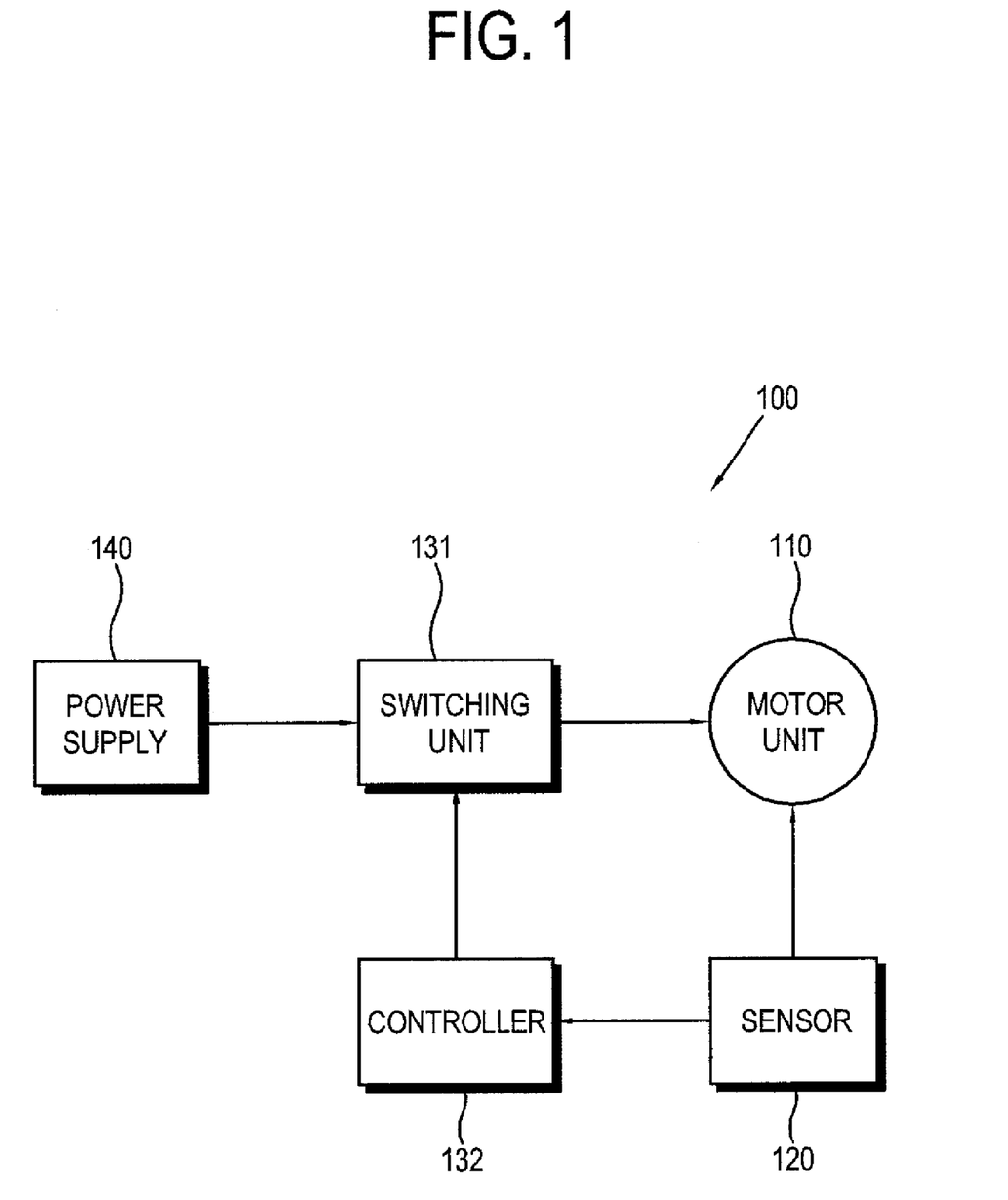
FIG. 1 is a block diagram of a motor apparatus according to an exemplary embodiment of the present invention.

Hereinafter, exemplary embodiments of the present invention will be described in more detail with reference to accompanying drawings. FIG. 1 is a block diagram of a brushless direct current (BLDC) motor apparatus 100 according to an exemplary embodiment of the present invention.

The BLDC motor apparatus 100 includes a motor unit 110, a power supply 140, a switching unit 141, a sensor 120, and a controller 132. The motor unit 110, which may be realized as a BLDC motor or the like, rotates to generate a torque under control of the controller 132.

The power supply 140 supplies driving power, i.e., DC power to the motor unit 110.

The switching unit 131 is turned on or off according to the control of the controller 132 and performs a switching operation to supply or not to supply the driving power to the motor unit 110.

The sensor 120 senses a rotated state of the motor unit 110 and sends sensed information to the controller 132.

The controller 132 controls rotation of the motor unit 110 on the basis of the sensed information about the rotated state of the motor unit 110, sent from the sensor 120.

Figure 2:
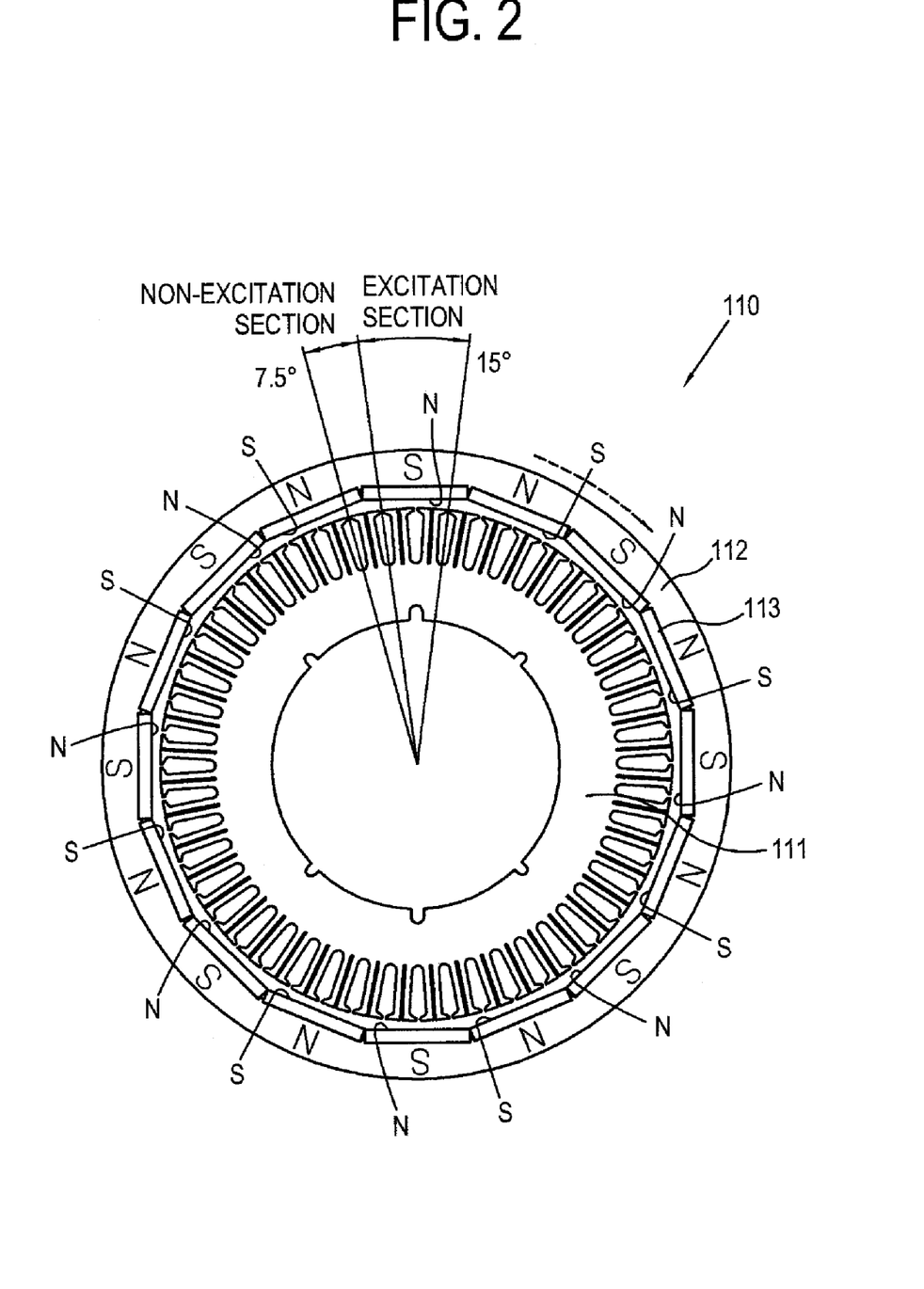
FIG. 2 shows a detailed configuration of a motor unit according to an exemplary embodiment of the present invention.

FIG. 2 shows a detailed configuration of the motor unit 110 according to an exemplary embodiment of the present invention. The motor unit 110 includes a stator 111 and a rotor 112. The stator 111 includes a plurality of windings corresponding to the number N of phases. The windings are provided in parallel and independently of each other.

The rotor 112 includes a plurality of poles 113 corresponding to the plurality of windings, and rotates with respect to the stator 111. Each pole 113 may be achieved by a permanent magnet. In this embodiment, the rotor 112 is provided in the form of an outer rotor, of which N and S poles are alternately arranged while surrounding the stator 111. Alternatively, if the rotor is provided in the form of an inner rotor, the rotator is surrounded with the stator.

In this embodiment, the number N may be three (i.e., three phases), and the total number of poles 113 may be sixteen. In this case, each pole 113 corresponds to three phases. However, the number of phases and the number of poles are not limited to this embodiment.

Figure 3:
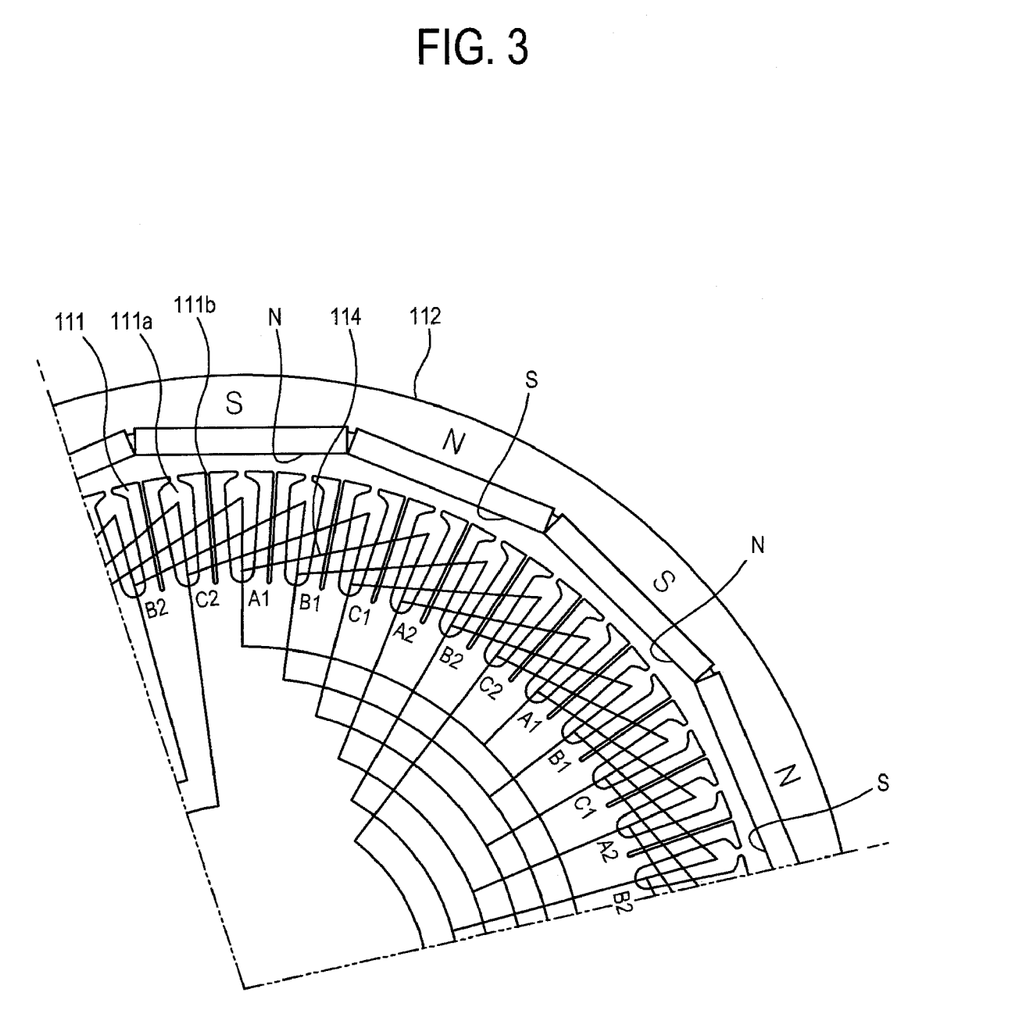
FIG. 3 shows a configuration of a stator and a winding according to an exemplary embodiment of the present invention.

FIG. 3 shows a configuration of the stator 111 and the winding according to an exemplary embodiment of the present invention. In this embodiment, the stator 111 has forty eight slots on which the windings 114 are wound, corresponding to three phases and sixteen poles.

Also, a magnetic-flux collision preventing groove 11 Ib is provided between two adjacent slots 1 1 ia. The width of the magnetic-flux collision preventing groove 111b is smaller than that of the slot 111a.

The magnetic-flux collision preventing groove 111b prevents the magnetic fluxes from colliding with each other when electric currents flow through the windings of two adjacent slots in the same direction. Further, a section where a counter electromotive force is generated at a pole altering point is reduced to about a half. Thus, a motor driving range becomes larger, so that an output density per unit volume (weight) increases. Also, a region with high efficiency and stability is used, so that a linear torque having a low torque ripple is obtained, thereby causing a stable drive and high efficiency.

In FIG. 3, A1, B1, represent the phases. The windings 114 corresponding to the respective phases are wound independently of each other. Sixteen windings 114 are connected in parallel with respect to each phase.

Figure 4:
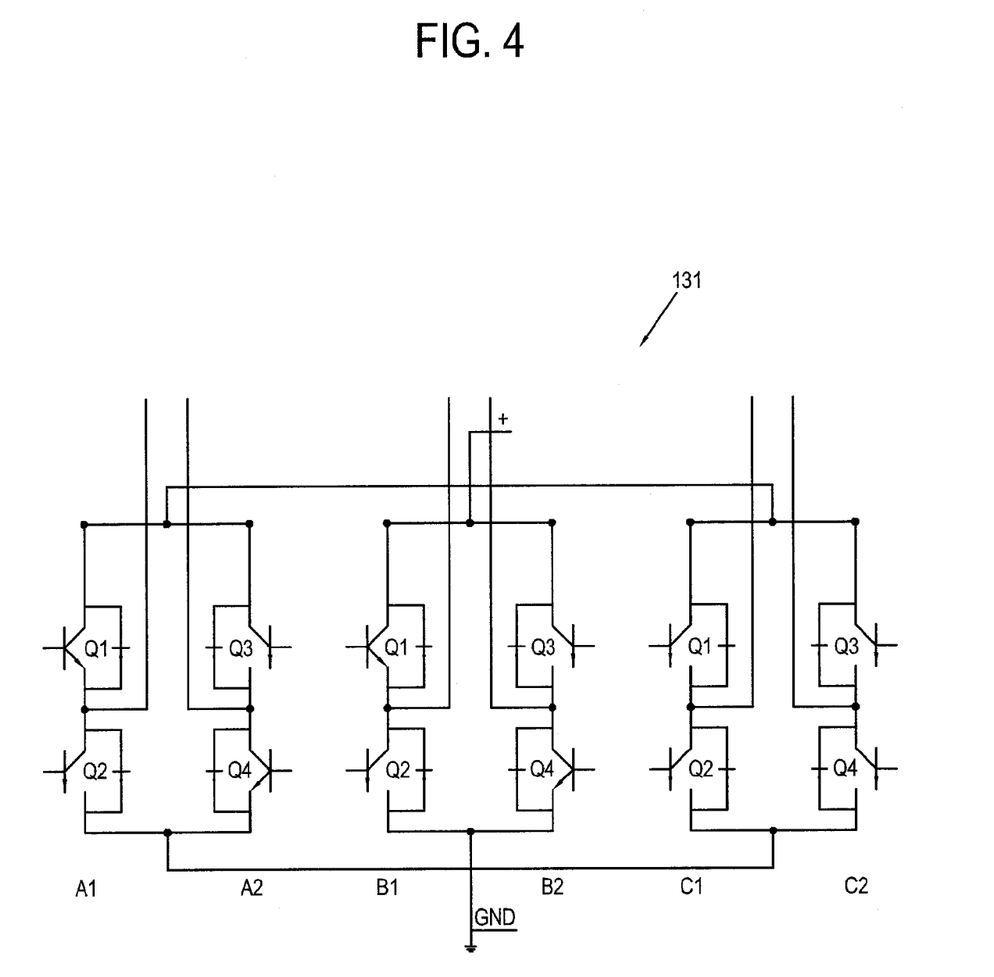
FIG. 4 is a circuit diagram of a switching unit according to an exemplary embodiment of the present invention.

FIG. 4 is a circuit diagram of the switching unit 131 according to an exemplary embodiment of the present invention. The switching unit 131 is provided in the form of a full H-bridge corresponding to each phase. In more detail, the switching unit 131 includes four switching devices Q1 through Q4 with respect to each phase. That is, the switching unit 131 includes a pair of upper switching devices Q1 and Q3 and a pair of lower switching devices Q2 and Q4.

The pair of upper switching devices Q1 and Q3 corresponds to a (+) side of the winding, and the pair of lower switching devices Q2 and Q4 corresponds to a (−) side of the winding. The four switching devices Q1 through Q4 corresponding to each phase are connected in parallel to the power supply 140. Each of the switching device Q1 through Q4 may be achieved by a field effect transistor (FET), an insulated gate bipolar transistor (IGBT), etc.

If one of the upper switching devices Q1 and Q3 and corresponding one of the lower switching devices Q2 and Q4 are turned on simultaneously, the winding 114 of the corresponding phase is excited. For example, the switching devices Q1 and Q4 are turned on at the same time, or the switching devices Q3 and Q2 are turned on at the same time.

The controller 132 uses a partial square wave to drive the pair of upper switching devices Q1 and Q3 and the pair of lower switching devices Q2 and Q4. That is, the controller 132 controls the upper switching devices Q1 and Q3 and the lower switching devices Q2 and Q4 so that only a region where an induced voltage is 70% of the maximum induced voltage or only a region where a magnetic flux of the rotor 112 is 70% of the maximum magnetic flux can be excited.

Figure 5:
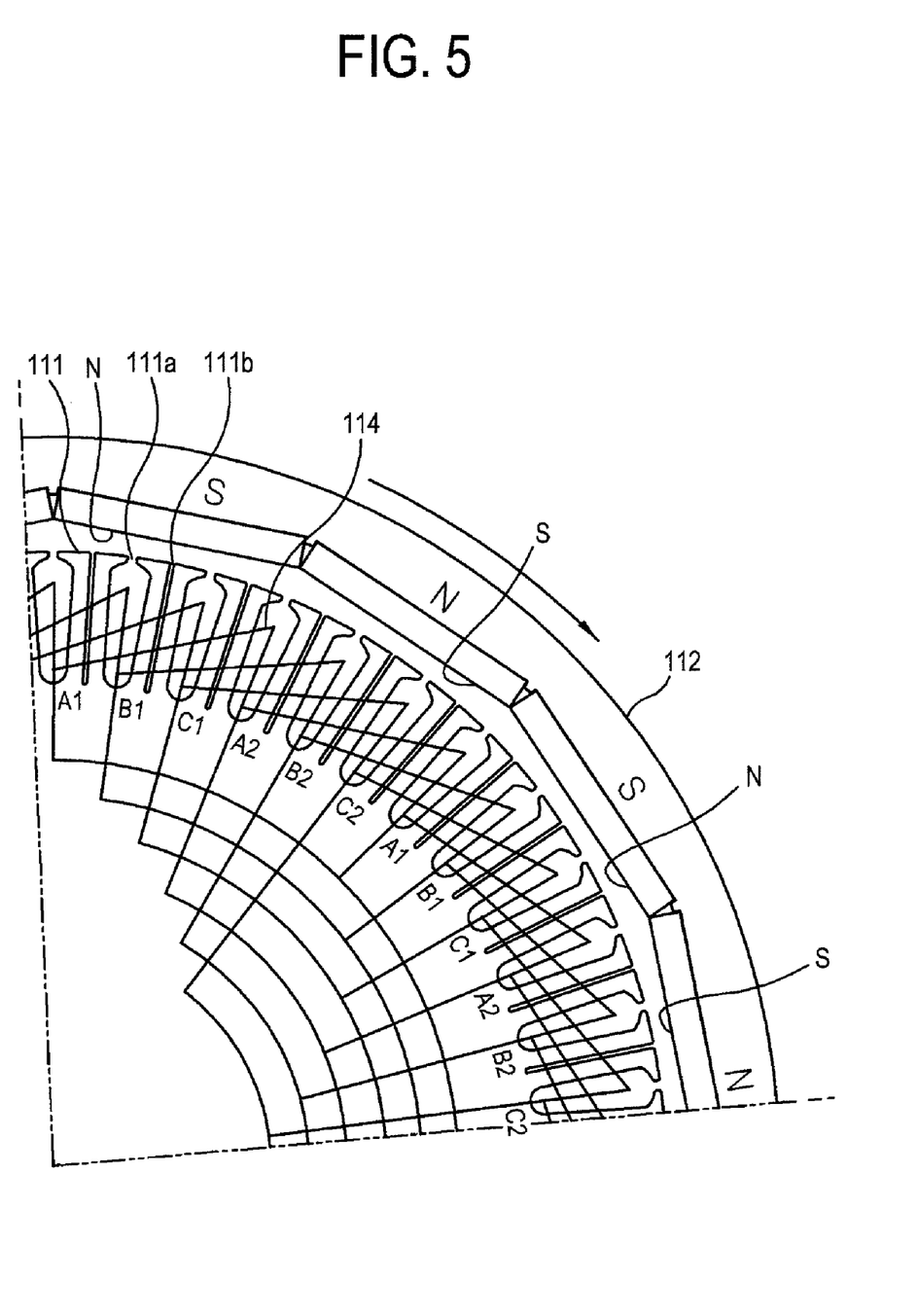
FIG. 5 shows another configuration of the stator and the winding according to an exemplary embodiment of the present invention.
Figure 6:
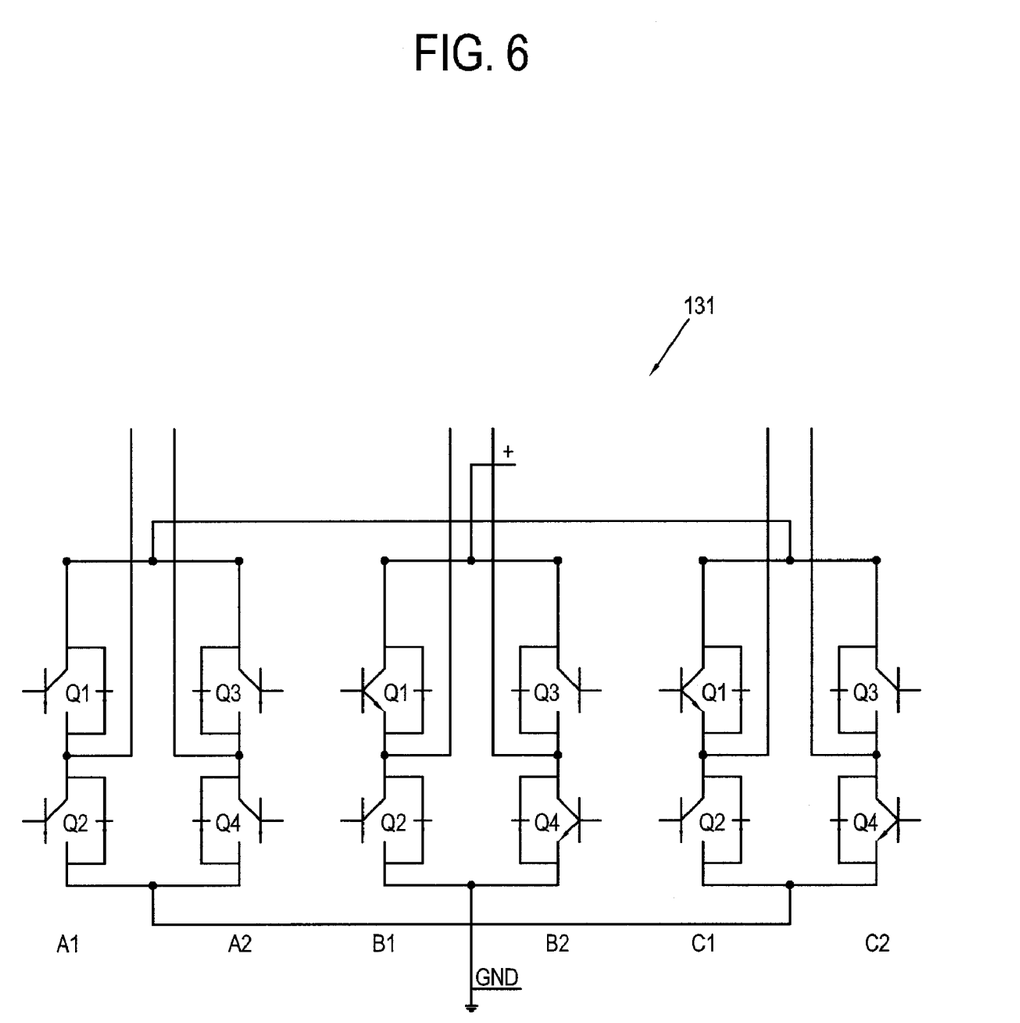
FIG. 6 is another circuit diagram of a switching unit according to an exemplary embodiment of the present invention.

For example, the controller 132 controls only two phases among three phases to be excited (refer to an excitation section in FIG. 2) but the other one phase not to be excited (refer to a non-excitation section in FIG. 2). Referring to FIGS. 3 and 4, the phases of A1 and B1 are excited, but the phases of C1 and C2 are not excited. On the other hand, FIGS. 5 and 6 show that the phases of B1 and C1 are excited, but the phases of A1 and A2 are not excited. In this embodiment, two phases among three phases are excited by way of example, but not limited thereto. Alternatively, how many phases are excited may be determined variously.

Figure 7:
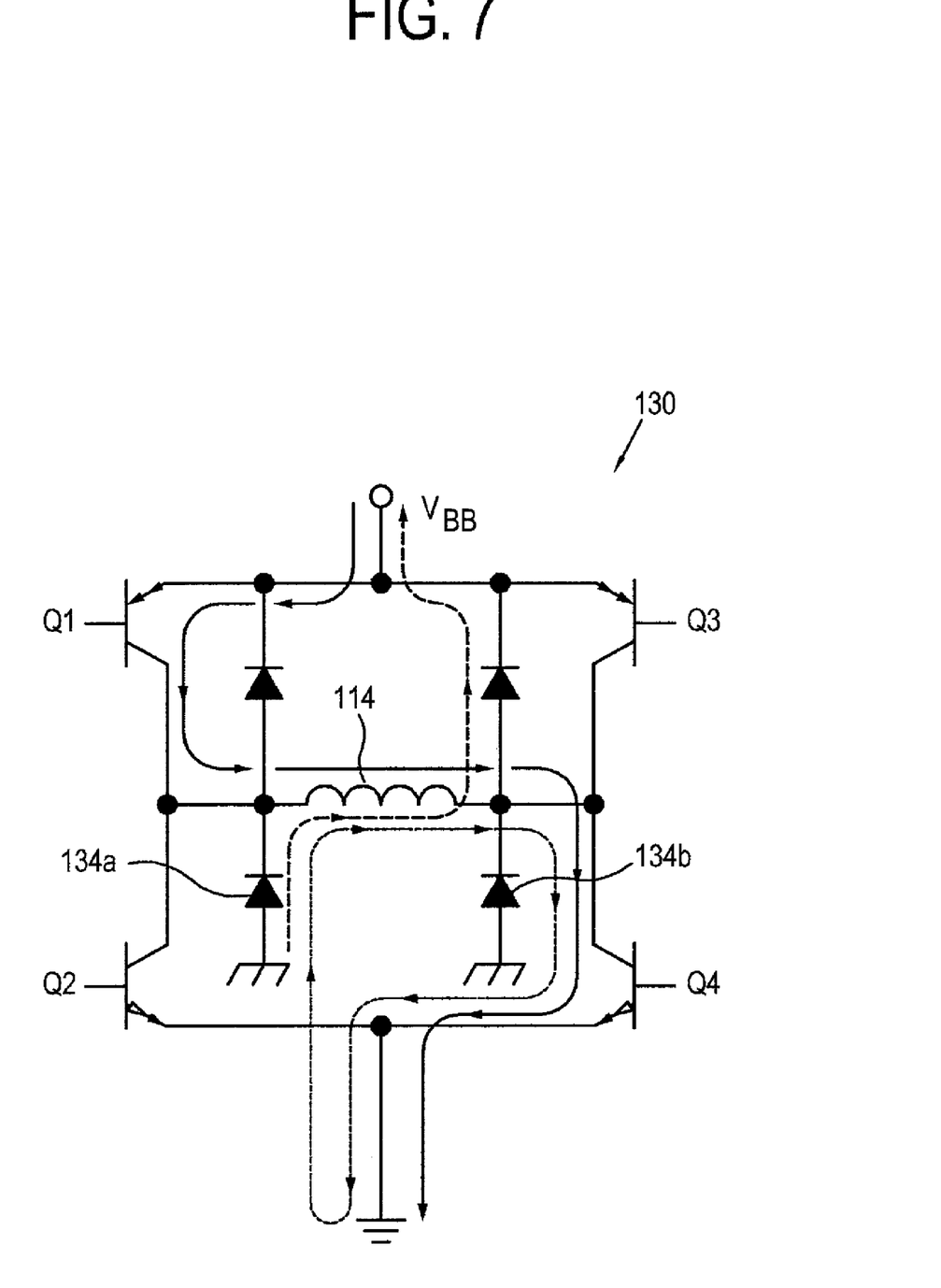
FIG. 7 is a detailed circuit diagram of the switching unit according to an exemplary embodiment of the present invention.

FIG. 7 is a detailed circuit diagram of the switching unit 131 according to an exemplary embodiment of the present invention. As shown in FIG. 7, the switching devices Q1 through Q4 include diodes 134a or 134b, respectively. The pair of lower switching devices Q2 and Q4 include a first diode 134a and a second diode 134b, respectively. Each of the first diode 134a and the second diode 134b has an anode connected to a ground, and a cathode connected to opposite ends of the winding 114.

With regard to the unexcited phase, the controller 132 controls the corresponding winding 114 to exhaust accumulated magnetic energy, thereby preventing the switching devices Q1 through Q4 from malfunction or damage. In other words, the controller 132 controls a switching operation of the lower switching devices Q2 and Q4 in order to make the electric current (i.e., an applied current and an induced current) smoothly flow out to the ground, so that there is no electric current staying in the winding 114 in the non-excitation section.

In more detail, the controller 132 controls the lower switching devices Q2 and Q4 to be turned off later than the upper switching devices Q1 and Q3. Further, the controller 132 may control the lower switching devices Q2 and Q4 to be turned on earlier than the upper switching devices Q1 and Q3.

For example, the pair of lower switching devices Q2 and Q4 is turned on and off while interlocking at the pole altering point. Here, the pole altering point is described by way of example. Alternatively, the switching point of the lower switching device Q2 or Q4 may be variously determined within a section between the pole altering point and the on- or off-point of the upper switching device Q1 or Q3. Here, only a time is needed to exhaust the electric current staying in the winding 114.

In this embodiment, the time to exhaust the electric current staying in the winding 114, i.e., the point of time to turn off the lower switching devices Q2 and Q4 with respect to the upper switching devices Q1 and Q3 is determined depending on a rotation speed of the rotor 112.

For example, if the rotation speed of the rotor 112 is low, it takes a relatively long time to flow out the electric current staying in the winding 114 since the input current is high but the induced voltage is low. In this case, the lower switching devices Q2 and Q4 are turned off after a lapse of a sufficiently long time after the upper switching devices Q1 and Q3 are turned off.

On the other hand, if the rotation speed of the rotor 112 is high, the electric current staying in the winding 114 is small, so that it can quickly flows out. In this case, the lower switching devices Q2 and Q4 are turned off after a lapse of a relatively short time after the upper switching devices Q1 and Q3 are turned off.

Consequently, the lapse of time from turning off the upper switching devices Q1 and Q3 to turning off the lower switching devices Q2 and Q4 is approximately in inverse proportion to the rotation speed of the rotor 112.

Meanwhile, the point of time to turn off the lower switching devices Q2 and Q4 with respect to the upper switching devices Q1 and Q3 may be determined depending on a relative position between the stator 111 and the rotor 112. For example, in the case of three phase, sixteen poles and forty eight slots, if the rotor 112 has a rotation speed of 60 rpm, a time taken in making one phase pass through one pole is about $\frac{1}{16}$ s=62.5 ms. In addition, if a lapse of time from turning off the upper switching devices Q1 and Q3 to turning off the lower switching devices Q2 and Q4 is 0.83 ms, the number of slots provided in the stator 111 corresponding to the elapsed time is 0.83 ms/(62.5 ms/three phases)=0.04.

Considering these results and drive stability, the lower switching devices Q2 and Q4 can be turned off after rotating the rotor 112 by 0.04 to 0.1 (slot) with respect to the stator 111 from the time when the upper switching devices Q1 and Q3 are turned off.

Thus, in this embodiment, the lower switching devices Q2 and Q4 are turned off later than the upper switching devices Q1 and Q3 by more than the time to exhaust the electric current staying in the winding 114, so that the switching devices Q1 through Q4 can be flexibly controlled according to the rotated state of the motor unit 110. Accordingly, the motor apparatus is stably driven with high reliability regardless of whether the rotation speed is high or low.

Referring to FIG. 7, for example, if the switching device Q4 is turned on while the switching device Q1 is not turned on, the first diode 134a, the winding 114 and the lower switching device Q4 constitute a closed circuit. At this time, an electric current can flow in the closed circuit, but the electric current may be exhausted by the magnetic energy accumulated in the winding 114.

Figure 8:
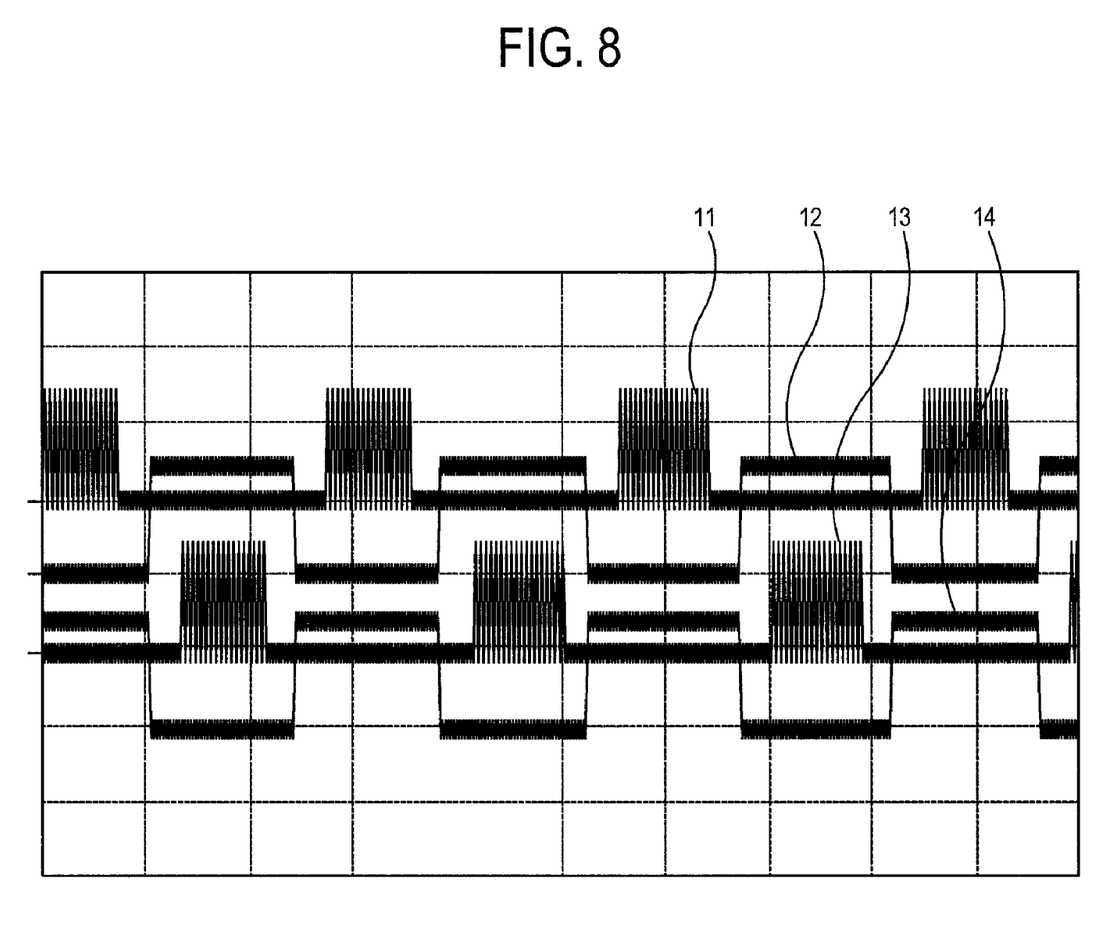
FIG. 8 shows waveforms of control signals for switching devices according to an exemplary embodiment of the present invention.

FIG. 8 shows waveforms of control signals for the switching devices Q1 through Q4 according to an exemplary embodiment of the present invention. In FIG. 8, 11 through 14 represent the waveforms of the control signals for the four switching devices Q1 through Q4, respectively. Each of the switching devices Q1 through Q4 is turned on if the waveform of the control signal is high, but turned off if the waveform of the control signal is low.

While the upper switching device Q1 or Q3 is turned on, the corresponding lower switching device Q2 or Q4 is being turned on. That is, even though the upper switching device Q1 or Q3 is turned off, there is a section where the lower switching device Q2 or Q4 is turned on. The section, where the upper switching device Q1 or Q3 is turned off but the lower switching device Q2 or Q4 is turned on, corresponds to the non-excitation section since they are not both turned on simultaneously.

According to an embodiment of the present invention, there are little counter electromotive force and little abnormal waveform, the switching device is prevented from malfunction and damage.

Also, not the low efficiency region but only the high efficiency region is used, so that the motor apparatus can have high efficiency. Further, the magnetic-flux collision preventing groove is used so that the magnetic fluxes generated between two adjacent slots can be prevented from colliding with each other. Furthermore, a region where the motor driving is impossible due to the counter electromotive force is reduced to a half, so that the motor driving range increases. Since the driving region increases with respect to the same motor volume, the output density can increase.

In the meantime, the sensor 120 is distributed with respect to each phase, and one or more sensing devices are provided per phase. Further, the sensing device includes a first sensing device to drive the upper switching device Q1 or Q3, and a second sensing device to drive the lower switching device Q2 or Q4. Alternatively, one sensing device may be used for driving both the upper switching device Q1 or Q3 and the lower switching device Q2 or Q4.

Figure 9:
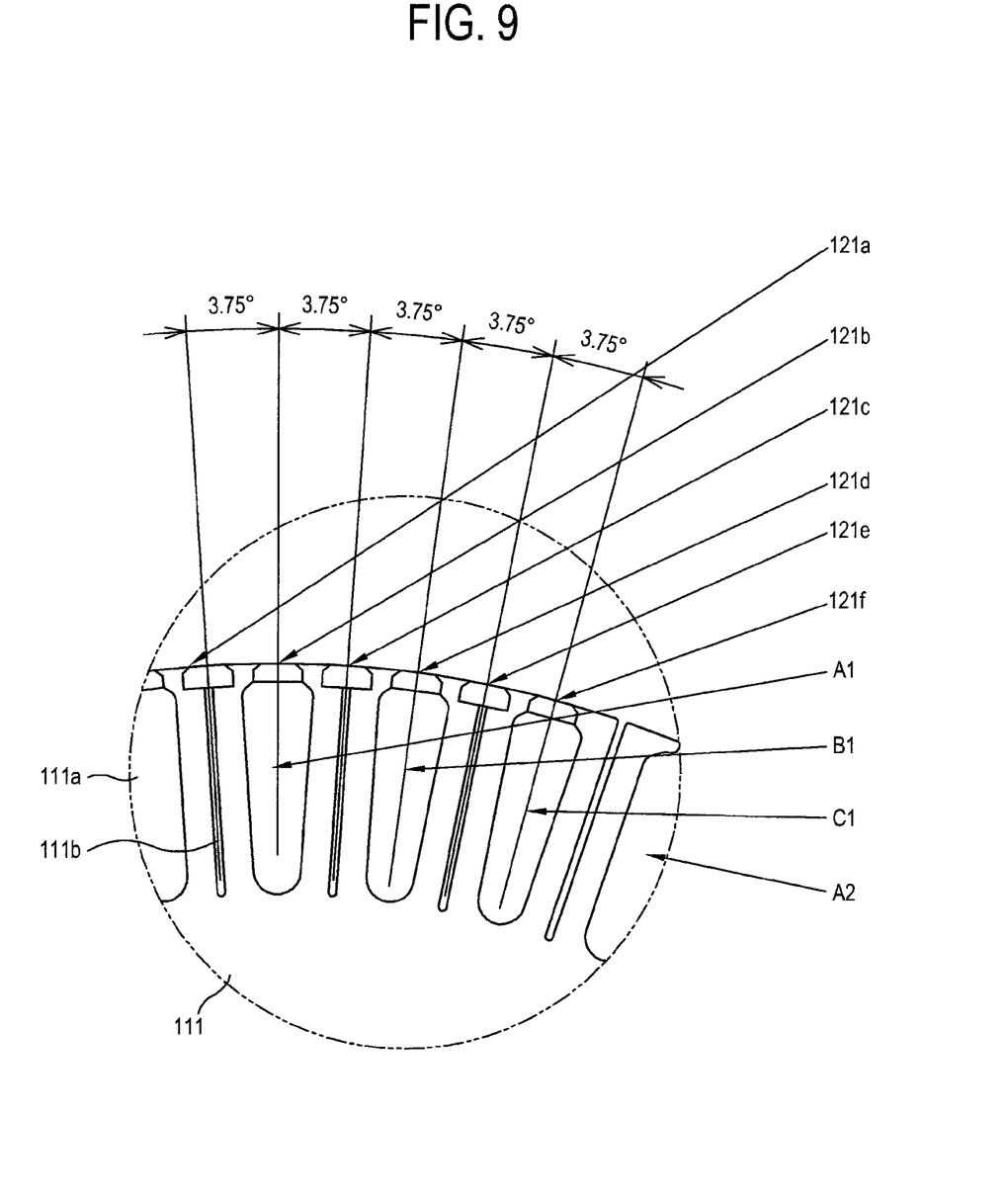
FIG. 9 shows a configuration of a sensor according to an exemplary embodiment of the present invention.

FIG. 9 shows a configuration of the sensor 120 according to an exemplary embodiment of the present invention. As shown in FIG. 9, the sensor 120 includes six Hall sensors 121a through 12 1f. The Hall sensors 121a through 12 1f are arranged in the stator 111 so that they correspond to the respective phases to sense the phase of the rotor 112. The Hall sensors 121a through 12 If are properly arranged to drive the upper switching device Q1 or Q3 and the lower switching device Q2 or Q4. For example, the Hall sensors 121a through 12 If are positioned to sense a position corresponding to a 70% range of the maximum magnetic flux, i.e., a region to drive the upper switching device Q1 or Q3.

The Hall sensors 121a through 121f send the controller 132 a sensing signal corresponding to polarity of the approaching pole 113. Then, the controller 132 controls the switching devices Q1 through Q4 to be turned on and off on the basis of the sensing signal sent from the Hall sensors 121a through 121f.

Alternatively, the sensor 120 may include a resolver (not shown) as an accurate sensor having high resolution in the form of combination of an encoder and a decoder Although a few exemplary embodiments of the present invention have been shown and described, it will be appreciated by those skilled in the art that changes may be made in these embodiments without departing from the principles and spirit of the invention, the scope of which is defined in the appended claims and their equivalents.

INDUSTRIAL APPLICABILITY

As described above, the present invention provides a BLDC motor apparatus capable of preventing a switching device from malfunction and damage.

Further, according to the present invention, a high-efficiency motor can be achieved, output density can increase, and a high-powered BLDC motor can be achieved.

Also, according to the present invention, a torque ripple can be reduced. In other words, only a high efficiency region, i.e., a region for achieving a certain torque is used, so that the torque ripple first becomes small within one section corresponding to one pole of one phase, and then torque with this small torque ripple forms a liner torque scheme by combination of phases connected in parallel, thereby achieving the liner torque with the very small torque ripple.

What is claimed is:

1. A brushless direct current (BLDC) motor apparatus comprising:
   a stator which is provided with a plurality of windings corresponding to N phases and wound in parallel independently of each other;
   a rotor which has a plurality of poles corresponding to the plurality of windings and rotates with respect to the stator by excitation of the windings;
   a switching unit which is provided in the form of a full H-bridge with respect to each phase, comprises a pair of upper switching devices corresponding to a positive side of the winding and a pair of lower switching devices corresponding to a negative side of the winding, and performs a switching operation to supply or not to supply driving power to the winding;
   a first sensing device which senses the phase of the rotor with respect to the stator to determine whether to turn on or off the upper switching device;
   a second sensing device which is provided in the latter part than the first sensing device and senses the phase of the rotor with respect to the stator to determine whether to turn on or off the lower switching device; and
   a controller which uses a partial square wave to drive the upper switching device and the lower switching device on the basis of the sensed phase of the rotor, and controls the lower switching device to be turned off later than the upper switching device by more than a time to exhaust an electric current staying in the winding.

2. The BLDC motor apparatus according to claim 1, wherein the controller controls the lower switching device to be turned on earlier than the upper switching device.

3. The BLDC motor apparatus according to claim 2, wherein the controller controls the lower switching device to be turned on or off at a pole altering point.

4. The BLDC motor apparatus according to claim 3, wherein the controller controls the upper switching device to be turned on in a 70% region of the maximum magnetic flux of the rotor.

5. The BLDC motor apparatus according to claim 2, wherein the time to exhaust the electric current staying in the winding corresponds to a rotation speed of the rotor.

6. The BLDC motor apparatus according to claim 2, wherein at least one of the first sensing device and the second sensing device comprises a Hall sensor.

7. The BLDC motor apparatus according to claim 2, wherein at least one of the first sensing device and the second sensing device comprises a resolver.

8. The BLDC motor apparatus according to claim 2, wherein the stator comprises:
   a plurality of slots on which the winding is wound; and
   a magnetic-flux collision preventing groove provided between two adjacent slots.

9. The BLDC motor apparatus according to claim 1, wherein the controller controls the lower switching device to be turned on or off at a pole altering point.

10. The BLDC motor apparatus according to claim 9, wherein the controller controls the upper switching device to be turned on in a 70% region of the maximum magnetic flux of the rotor.

11. The BLDC motor apparatus according to claim 1, wherein the time to exhaust the electric current staying in the winding corresponds to a rotation speed of the rotor.

12. The BLDC motor apparatus according to claim 1, wherein at least one of the first sensing device and the second sensing device comprises a Hall sensor.

13. The BLDC motor apparatus according to claim 1, wherein at least one of the first sensing device and the second sensing device comprises a resolver.

14. The BLDC motor apparatus according to claim 1, wherein the stator comprises:
   a plurality of slots on which the winding is wound; and
   a magnetic-flux collision preventing groove provided between two adjacent slots.

* * * * *